(12) United States Patent
Strassburger et al.

(10) Patent No.: US 9,576,453 B2
(45) Date of Patent: Feb. 21, 2017

(54) CONSUMER REMOVABLE TAG HOUSING ASSEMBLY FOR ATTACHMENT TO A BOTTLE NECK

(71) Applicant: B&G PLASTICS, INC., Union, NJ (US)

(72) Inventors: Jacob Strassburger, South Plainfield, NJ (US); Alex Tetiyevsky, Springfield, NJ (US); Daniel V. Cunneen, Waldwick, NJ (US); Maxwell Strassburger, South Plainfield, NJ (US)

(73) Assignee: B&G Plastics, Inc., Union, NJ (US)

( * ) Notice: Subject to any disclaimer, the term of this patent is extended or adjusted under 35 U.S.C. 154(b) by 0 days.

(21) Appl. No.: 15/027,900

(22) PCT Filed: Oct. 21, 2014

(86) PCT No.: PCT/US2014/061487
§ 371 (c)(1),
(2) Date: Apr. 7, 2016

(87) PCT Pub. No.: WO2015/061258
PCT Pub. Date: Apr. 30, 2015

(65) Prior Publication Data
US 2016/0275768 A1    Sep. 22, 2016

Related U.S. Application Data

(60) Provisional application No. 61/893,445, filed on Oct. 21, 2013.

(51) Int. Cl.
*G06K 7/08*    (2006.01)
*G08B 13/24*    (2006.01)
(Continued)

(52) U.S. Cl.
CPC .......... *G08B 13/2434* (2013.01); *B65D 23/14* (2013.01); *E05B 73/0041* (2013.01); *G06K 19/07758* (2013.01)

(58) Field of Classification Search
USPC .................... 340/572.8, 572.1; 235/451, 381
See application file for complete search history.

(56) References Cited

U.S. PATENT DOCUMENTS 3,214,808 A    11/1965    Litwin
3,685,676 A    8/1972    Gach et al.
(Continued)

FOREIGN PATENT DOCUMENTS

GB    2465892 A    6/2010
WO    2007/086984 A1    8/2007
(Continued)

*Primary Examiner* — Ahshik Kim
(74) *Attorney, Agent, or Firm* — Hoffmann & Baron, LLP

(57) ABSTRACT

An electronic tag housing assembly is attachable to the extending neck of a bottle having an undercut thereabout. The tag housing includes an annular wall having a central opening for insertion over the extending bottle neck. At least one electronic tag is supported in the housing. The housing has a plurality of resilient fingers extending into the aperture for engagement with undercut on the bottle neck for securing the housing thereto. The housing further includes a portion of the annular wall having a location of reduced thickness for effecting severing of the annular wall thereat so as to remove the housing from the bottle neck.

18 Claims, 11 Drawing Sheets

(51) Int. Cl.
*B65D 23/14* (2006.01)
*E05B 73/00* (2006.01)
*G06K 19/077* (2006.01)

(56) References Cited

U.S. PATENT DOCUMENTS

| | | | |
|---|---|---|---|
| 3,756,444 | A | 9/1973 | McIntosh |
| 3,853,236 | A | 12/1974 | Ostrowsky |
| 3,902,339 | A | 9/1975 | Carley et al. |
| 3,915,326 | A | 10/1975 | Hrubesky |
| 4,018,640 | A | 4/1977 | Amberg |
| 4,089,463 | A | 5/1978 | Babiol |
| 4,176,756 | A | 12/1979 | Gellman |
| 4,241,188 | A | 12/1980 | Materia et al. |
| 4,405,161 | A | 9/1983 | Young et al. |
| 4,457,445 | A | 7/1984 | Hanks et al. |
| 4,471,982 | A | 9/1984 | Nielsen, Jr. |
| 4,674,778 | A | 6/1987 | Ruiz |
| 4,729,487 | A | 3/1988 | Wright |
| 4,813,564 | A | 3/1989 | Cooper et al. |
| 5,230,541 | A | 7/1993 | Nowak |
| 5,602,530 | A | 2/1997 | Holmgren |
| 5,667,085 | A | 9/1997 | Ogden et al. |
| 6,098,256 | A | 8/2000 | Poussard |
| 6,137,413 | A | 10/2000 | Ryan, Jr. |
| 6,254,139 | B1 | 7/2001 | Fresnel |
| 6,342,838 | B1 | 1/2002 | Kolton et al. |
| 6,604,643 | B1 | 8/2003 | Michael et al. |
| 6,696,955 | B2 | 2/2004 | Kolton et al. |
| 6,831,552 | B2 | 12/2004 | Lin |
| D506,694 | S | 6/2005 | Corney |
| 6,912,878 | B2 | 7/2005 | Belden, Jr. |
| 7,048,179 | B2 | 5/2006 | Claessens et al. |
| 7,061,382 | B2 | 6/2006 | Claessens et al. |
| 7,129,841 | B2 | 10/2006 | Feibelman |
| 7,185,399 | B2 | 3/2007 | Logan |
| 7,394,383 | B2 | 7/2008 | Hager et al. |
| 7,650,768 | B2 | 1/2010 | Fawcett et al. |
| 7,804,405 | B2 | 9/2010 | Norman et al. |
| 8,267,326 | B2 | 9/2012 | Kolton et al. |
| 8,294,583 | B2 * | 10/2012 | Sayegh ............... E05B 73/0017 24/16 PB |
| 9,311,797 | B2 * | 4/2016 | Yang .................. G08B 13/2434 |
| 2006/0151414 | A1 | 7/2006 | Mullen |
| 2006/0180650 | A1 | 8/2006 | Claessens et al. |
| 2007/0062903 | A1 | 3/2007 | Norman et al. |
| 2007/0262876 | A1 | 11/2007 | Marsilio et al. |
| 2007/0285243 | A1 | 12/2007 | Feibelman |
| 2008/0030334 | A1 | 2/2008 | Marsilio et al. |
| 2008/0048868 | A1 | 2/2008 | Chua et al. |
| 2008/0230509 | A1 | 9/2008 | Koo et al. |
| 2008/0289372 | A1 | 11/2008 | Rendon et al. |
| 2010/0005840 | A1 | 1/2010 | Hogan et al. |
| 2010/0085191 | A1 | 4/2010 | Kolton et al. |
| 2010/0133224 | A1 | 6/2010 | Kolton et al. |
| 2010/0141384 | A1 | 6/2010 | Chen et al. |
| 2010/0253524 | A1 | 10/2010 | Kolton et al. |
| 2011/0074583 | A1 | 3/2011 | Kolton et al. |
| 2012/0024962 | A1 | 2/2012 | Kolton et al. |
| 2012/0105231 | A1 | 5/2012 | Strassburger et al. |

FOREIGN PATENT DOCUMENTS

| | | |
|---|---|---|
| WO | 2008/075310 A2 | 6/2008 |
| WO | 2010055449 A2 | 5/2010 |

* cited by examiner

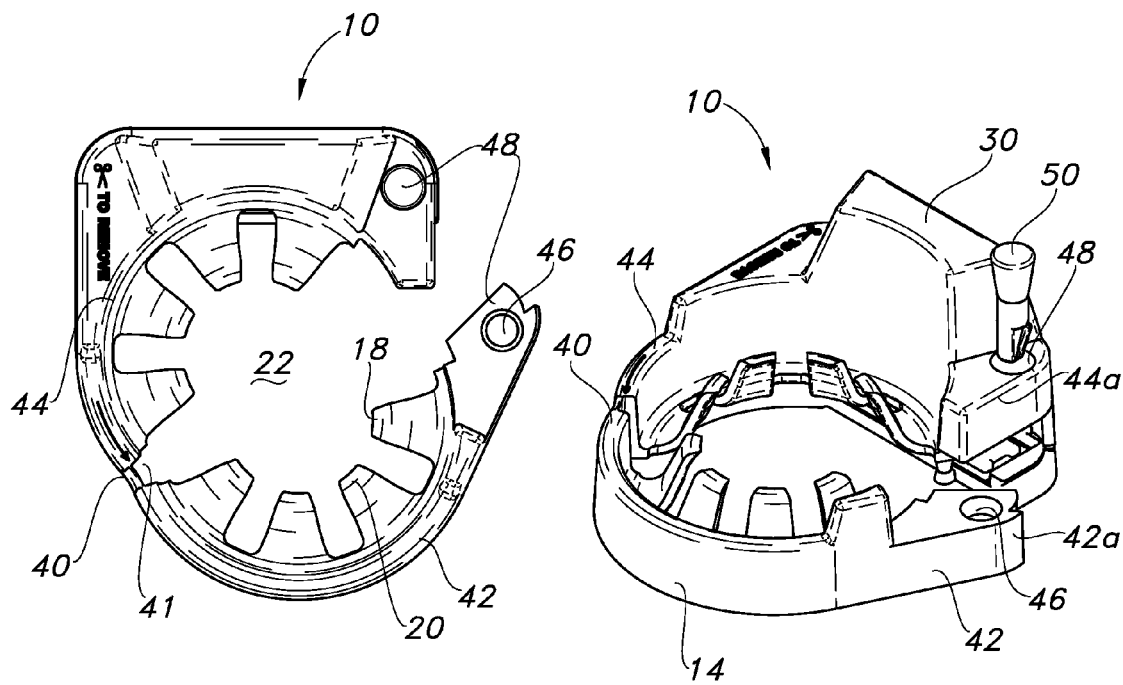
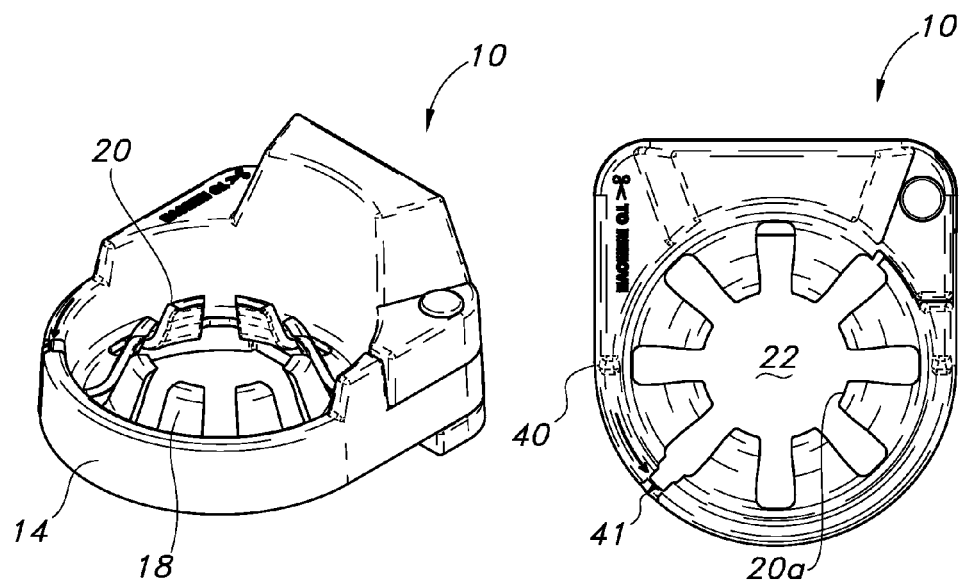

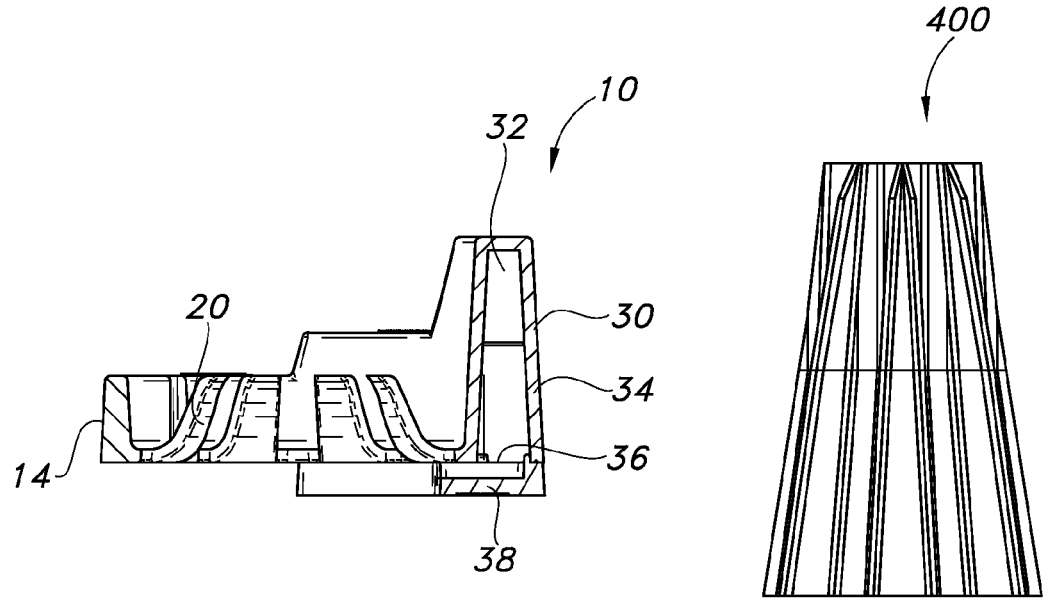
FIG. 7
FIG. 8
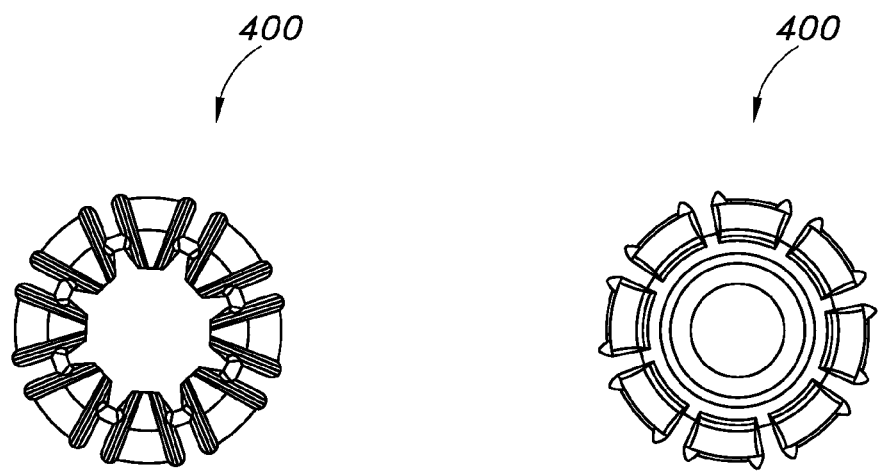
FIG. 9
FIG. 10

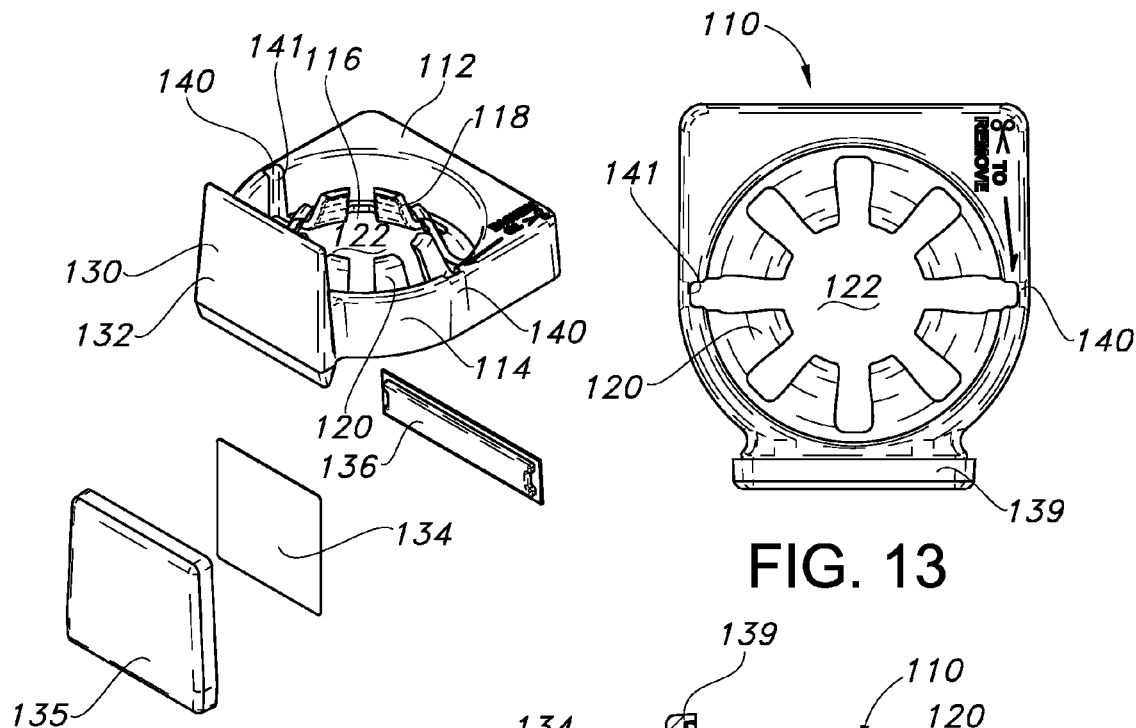
FIG. 11
FIG. 13
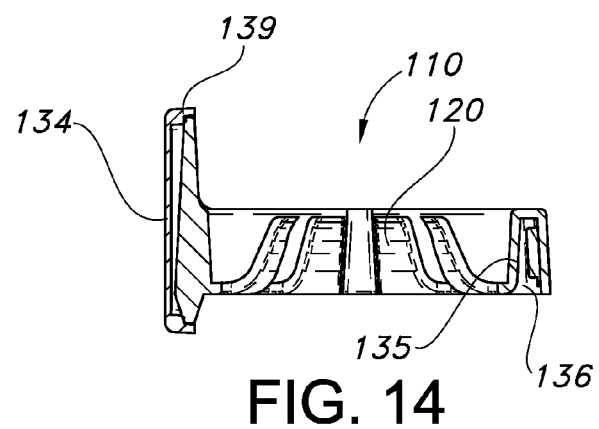
FIG. 14
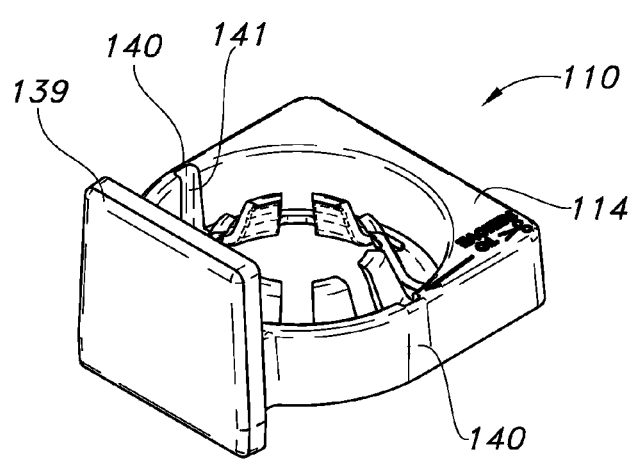
FIG. 12
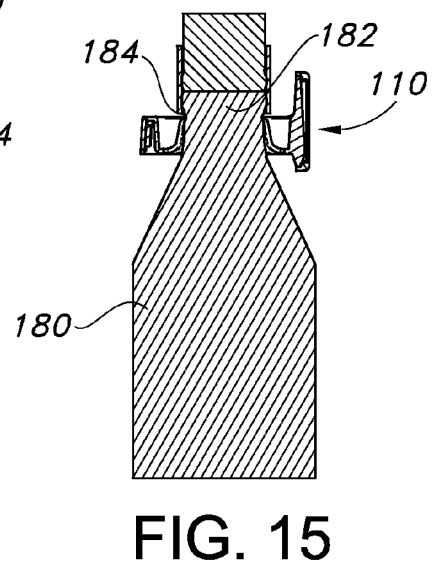
FIG. 15

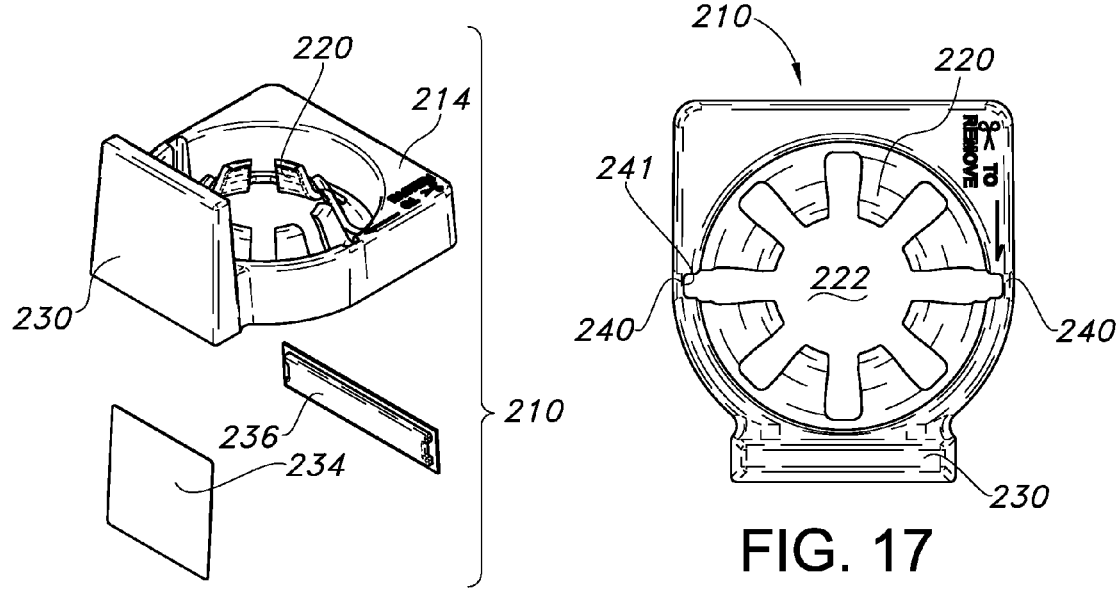
FIG. 16
FIG. 17
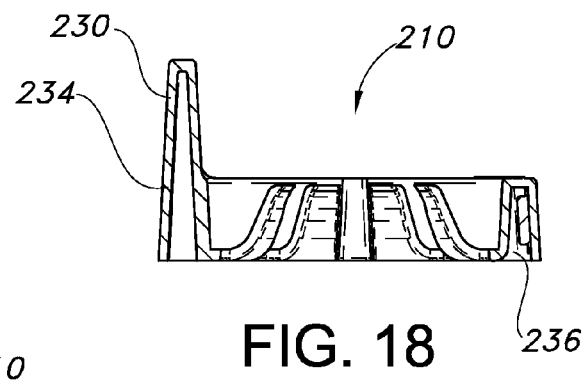
FIG. 18
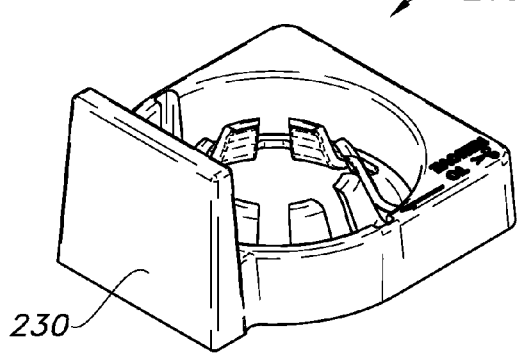
FIG. 19
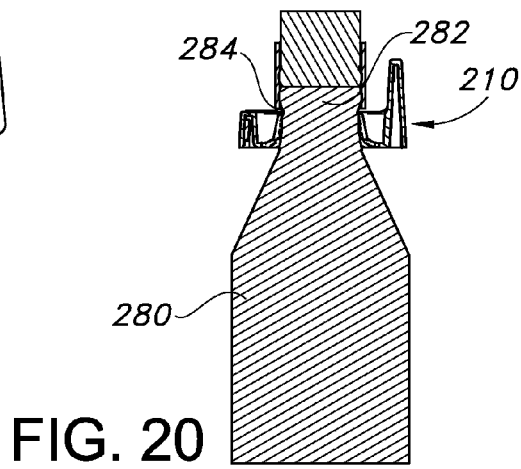
FIG. 20

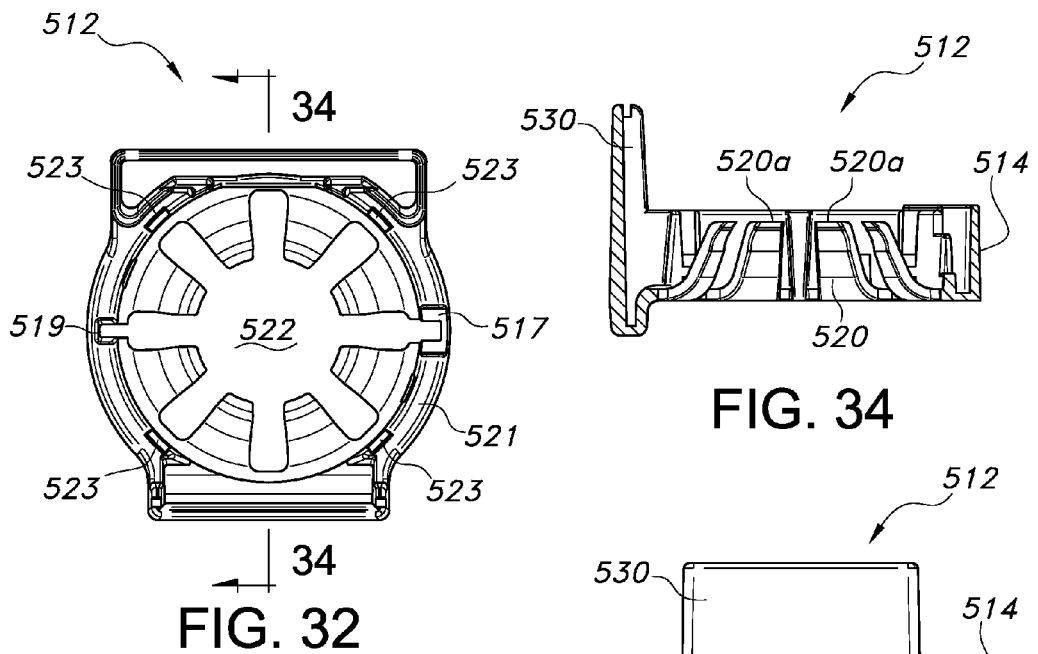
FIG. 32
FIG. 34
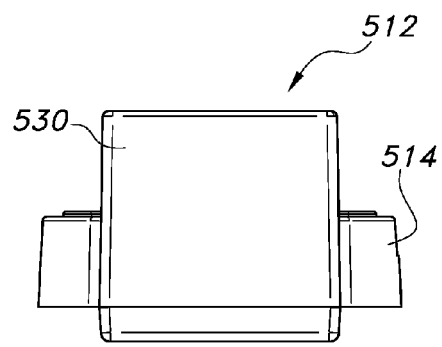
FIG. 35
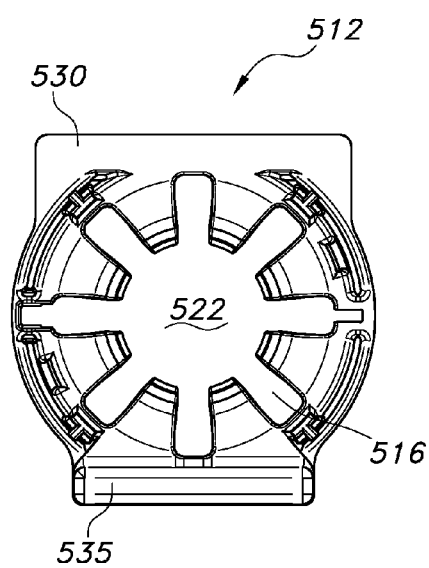
FIG. 33
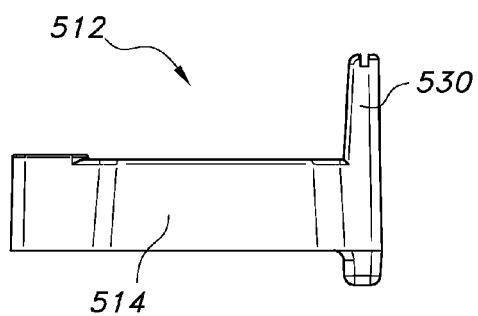
FIG. 36

CONSUMER REMOVABLE TAG HOUSING ASSEMBLY FOR ATTACHMENT TO A BOTTLE NECK

CROSS REFERENCE TO RELATED APPLICATIONS

This application is a U.S. National Phase Application of, and claim priority from, International Application No. PCT/US2014/061487, filed on Oct. 21, 2014, which claims priority from U.S. Provisional Patent Application No. 61/893,445, filed on Oct. 21, 2013, the content of each of which is incorporated herein by reference in its entirety.

FIELD OF THE INVENTION

The present invention relates generally to a housing which accommodates electronic tags and attaches to the extending neck of a bottle. More particularly, the present invention relates to an electronic tag housing which may be secured to the neck of a bottle for subsequent removal by the consumer.

BACKGROUND OF THE INVENTION

Electronic tags have a wide variety of uses, including the tracking of items which contain the tag, inventory control, security, and the provision for electronically readable information. These electronic tags may take various forms. For example, the tags may include radio frequency identification (RFID) tags and electronic article surveillance (EAS) tags. Whether for identification, security or other purposes, the tags are typically one of two types, either a dual resonator (DR) tag or a radio frequency (RF) tag.

Tags of this type are typically enclosed or supported in a variety of different devices such as holders, housings and the like, which provide for the secure accommodation of the tag and also may be securely attached to the article to prevent unauthorized removal therefrom. These tags remain with the article after purchase, are removed from article at the time of purchase or may be removed by the consumer after purchase.

With respect to certain articles, such as bottles for containing beverages or other liquids, various housings have been developed to secure the tag to the extending neck of the bottle itself. Such bottle neck tag housings of this type are shown and described in commonly-assigned U.S. Provisional Patent Application No. 61/769,917, entitled "Single Component Tag Housing Assembly For Removable Attachment to a Bottle Neck," U.S. Provisional Patent Application No. 61/769,926, entitled "Dual Component Tag Housing Assembly For Removable Attachment to a Bottle Neck," and U.S. Provisional Patent Application No. 61/819,012, entitled "One-Piece Tag Housing Assembly For Non-Removable Attachment to a Bottle Neck," the contents of all of which are incorporated by reference herein for all purposes.

As is common with bottle neck tag housings disclosed in the above-incorporated applications, the tag housing is typically secured to the bottle by passing it over the bottle neck through an aperture in the housing. The housings shown include flexible fingers which engage a perimetrical undercut on the bottle neck. These flexible fingers engage the bottle neck at the undercut to secure the tag housing to the bottle.

As noted above, after purchase, the consumer may leave the tag housing on the bottle as the bottle may be used unencumbered by the tag housing. However, for aesthetic purposes, the consumer may desire to remove the tag housing before use. In situations where the tag housing is not removed at the point of purchase, it is up to the consumer to remove the tag housing from the bottle. Such removal is difficult as the tag housing by its nature is securely attached to the bottle neck to prevent unauthorized removal.

It is, therefore, desirable to provide a tag housing which may be easily removed from a bottle neck by the consumer after purchase.

SUMMARY OF THE INVENTION

The present invention provides an electronic tag housing assembly for attachment to an extending neck of a bottle having an undercut thereabout. The assembly includes a housing having an annular wall and a central opening for insertion over the extending bottle neck. At least one electronic tag is supported by the housing. The housing further includes a plurality of resilient fingers extending into the aperture for engagement with the undercut on the bottle neck for securing the housing thereto. The housing further includes a portion of the annular wall having a location of reduced thickness for effecting severing of the annular wall thereat so as to remove the housing from the bottle neck.

In a preferred embodiment, the location of reduced thickness also provides a living hinge for opening the annular wall. As used herein, the term "reduced thickness" refers to a portion of the outer or exterior wall of the annular wall, wherein the thickness of the wall is reduced by at least 50%, preferably by at least 35% and most preferably by at least 20% in comparison to the thickness of the other portions of the outer or exterior wall. When used with other wall structures (i.e., other than an annular wall), the term "reduced thickness" refers to a portion of the wall, wherein the thickness of the wall is reduced by at least 50%, preferably by at least 35% and most preferably by at least 20% in comparison to the maximum thickness of the wall at any other point.

The electronic tag housing assembly may also include a locking device attachable to the annular wall having engagement elements positioned between the annular wall and at least one of the plurality of resilient fingers to prevent deflection of the fingers and detachment of the housing assembly from the bottle neck.

In another embodiment, the electronic tag housing assembly for attachment to an extending neck of a bottle having an undercut thereabout includes: a housing, at least one electronic tag, a locking device and a U-shaped tab. The housing has an annular wall that includes an inner wall connected by a top wall to an outer wall, a notch and a central opening for receiving therethrough the extending bottle neck. The inner wall has one or more slots extending downwardly from the top wall to a recess. The housing has a plurality of resilient fingers extending from the inner wall into the central opening for engagement with the undercut on the bottle neck for securing the housing thereto. The housing can include a compartment with an open side extending upwardly from the annular wall and an enclosure with an open top extending outwardly from the annular wall on an opposing side of the housing. The housing can also include a slot in the inner wall positioned opposite the notch and extending downwardly from the top wall.

The at least one electronic tag is supported by the housing. The at least one electronic tag can be a dual resonator (DR) tag, a radio frequency (RF) tag or a dual resonator tag and a radio frequency tag.

The locking device has a substantially circular lower side wall with a first diameter and a first thickness connected to a substantially circular upper side wall having a second diameter and a second thickness by a ledge. The first diameter is greater than the second diameter and the upper side wall and the lower side wall define an aperture. A slit extending through the upper side wall, the lower side wall and the ledge forms a first wall section and a second wall section. The lower side wall includes one or more flexible legs extending downwardly from the ledge to a distal end with a stub extending outwardly. The locking device can also include a cover extending outwardly and upwardly from the ledge and a lid extending outwardly from the ledge on an opposing side of the locking device. The cover and the lid are correspondingly located with the compartment and the enclosure, respectively. The locking device can also include a prong that extends outwardly from the ledge opposite the slit. When the locking device is secured to the housing, the cover is secured to the open side of the compartment, the lid is secured to the open top of the enclosure and the prong is engaged in the slot.

The U-shaped tab includes a base with first and second legs extending therefrom with a slot in between the legs. The first and second legs are connected to the first and second wall sections, respectively, of the locking device. The base has a third thickness that is less than the first and second thicknesses. The locking device is positioned on the housing so that the plurality of flexible fingers extends through the aperture and the tab is positioned in the notch. After a bottle neck is inserted into the central opening, the locking device is pushed down into the housing so that the stubs on the flexible legs engage the recesses in the locking slots to secure the locking device to the housing and the upper side wall pushes the plurality of resilient flexible fingers inwardly to engage the neck of the bottle below the undercut, and wherein the housing assembly can be removed from the bottle neck by severing the base of the tab.

BRIEF DESCRIPTION OF THE DRAWINGS

FIGS. 3 and 4 show the tag housing assembly of FIG. 1 in an open condition.

FIGS. 5 and 6 show the tag housing assembly of FIG. 1 in a closed condition.

FIG. 7 is a sectional view of the tag housing assembly of FIG. 1.

FIGS. 8, 9 and 10 show an accessory used to mount the tag housing assembly of the present invention on a bottle neck.

FIG. 11 is an exploded perspective view of a further embodiment of the tag housing assembly of the present invention.

FIGS. 12, 13 and 14 show, respectively, perspective view, a top view and a sectional view of the tag housing assembly of FIG. 11.

FIG. 15 is a sectional showing of the tag housing assembly of FIG. 11 attached to a bottle.

FIG. 16 is an exploded perspective view of a further embodiment of the tag housing assembly of the present invention.

FIGS. 17, 18 and 19 show respectively, in top plan, sectional and perspective views the tag housing assembly of FIG. 16.

FIG. 20 is a sectional showing of the tag housing assembly of FIG. 16 secured to a bottle.

FIG. 32 is a top view of the housing of the tag housing assembly shown in FIG. 28.

FIG. 33 is a bottom view of the housing of the tag housing assembly shown in FIG. 28.

FIG. 34 is a side sectional view of the housing of the tag housing assembly shown in FIG. 28.

FIG. 35 is an end view of the housing of the tag housing assembly shown in FIG. 28.

FIG. 36 is a side view of the housing of the tag housing assembly shown in FIG. 28.

DETAILED DESCRIPTION OF THE PREFERRED EMBODIMENTS

Figure 1:
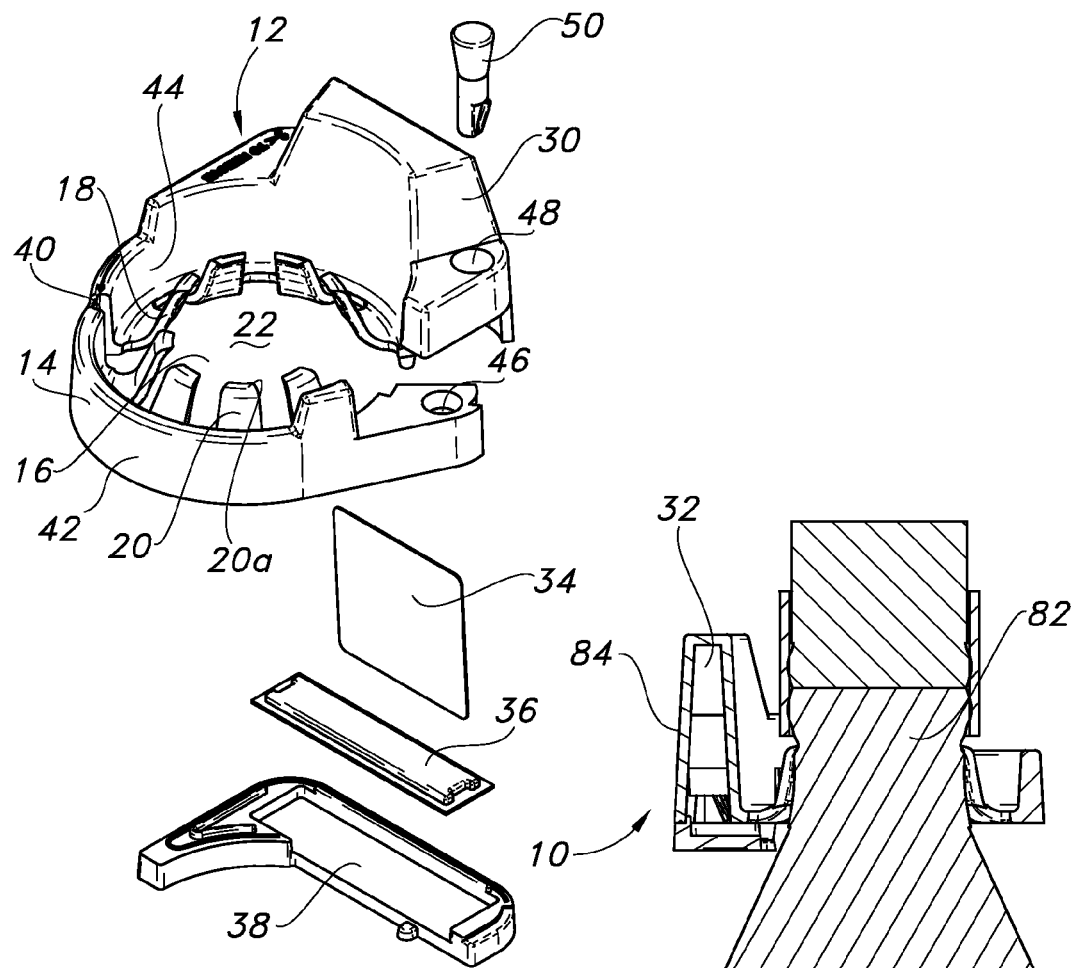
FIG. 1 is an exploded perspective view of one embodiment of the tag housing assembly of the present invention.
Figure 2:
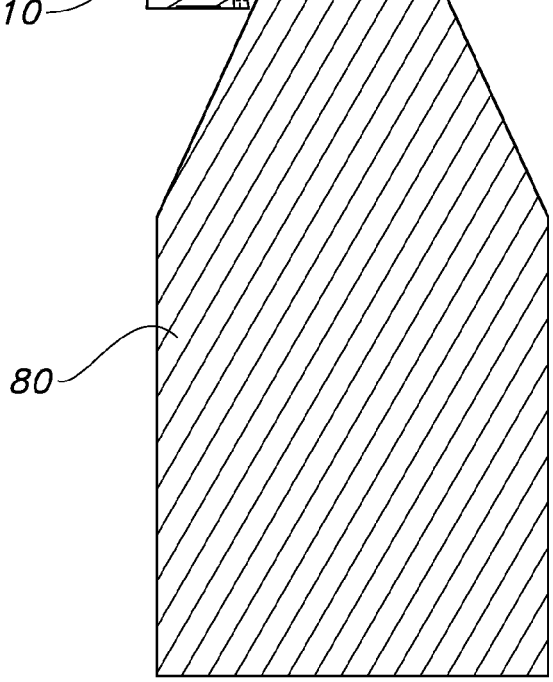
FIG. 2 is a sectional view of the tag housing assembly of FIG. 1 attached to a bottle.
Figure 21:
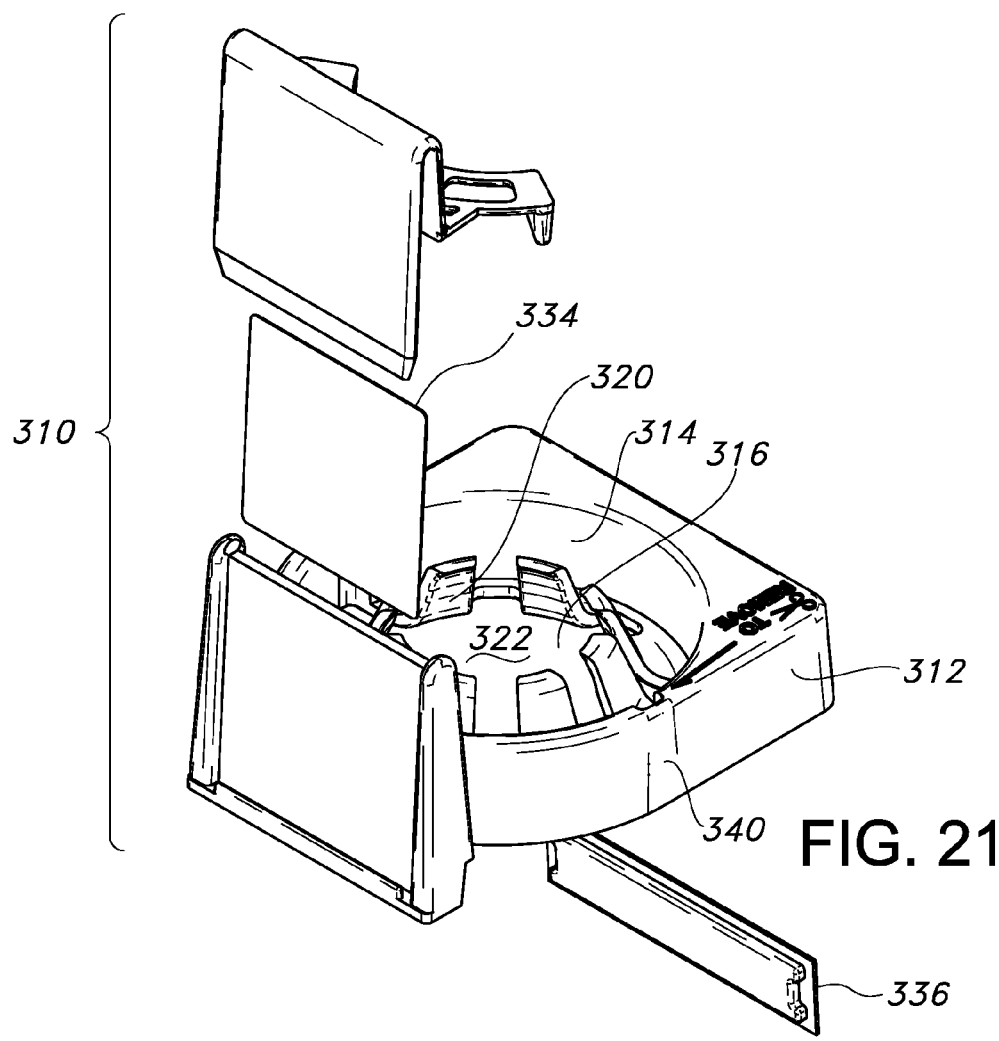
FIG. 21 is an exploded perspective showing of a further embodiment of the tag housing assembly of the present invention.
Figure 22:
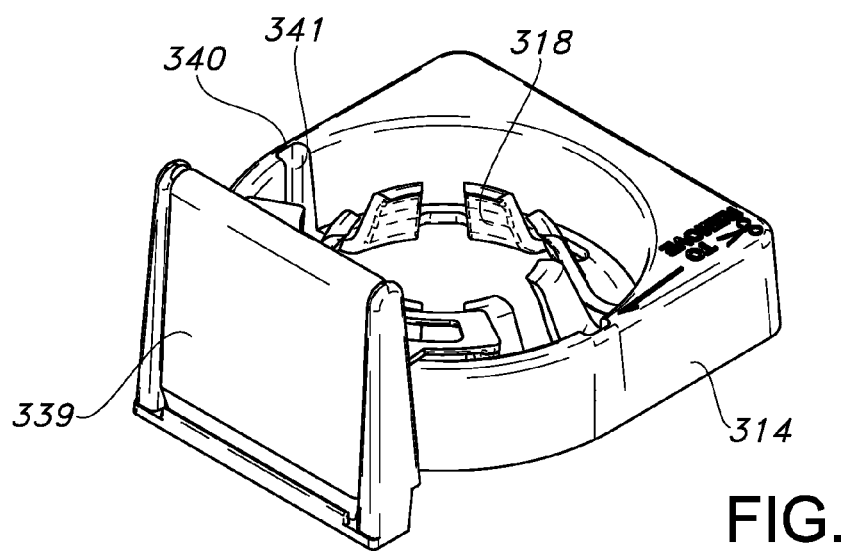
FIGS. 22 and 23 are, respectively, a perspective view and top plan view of the tag housing assembly of FIG. 21.
Figure 23:
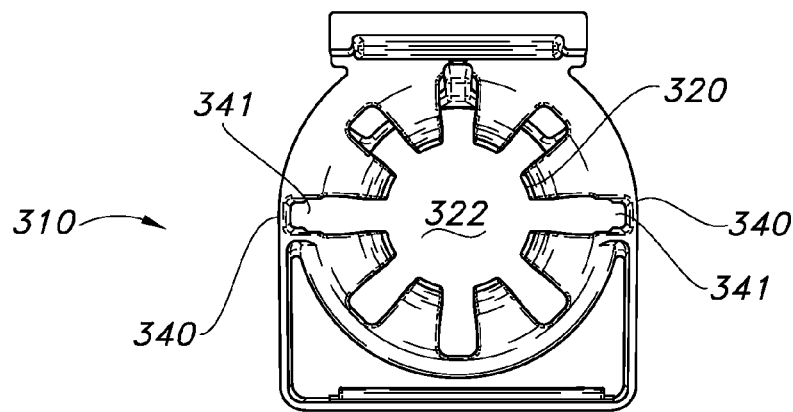
Figure 24:
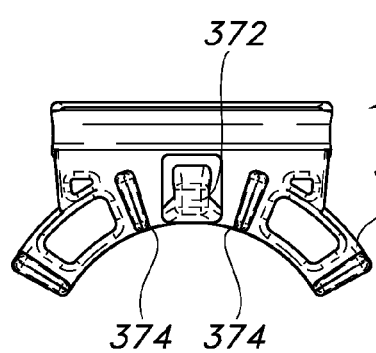
FIGS. 24, 25 and 26 show various views of a locking device attachable to the tag housing assembly of FIG. 21.
Figure 25:
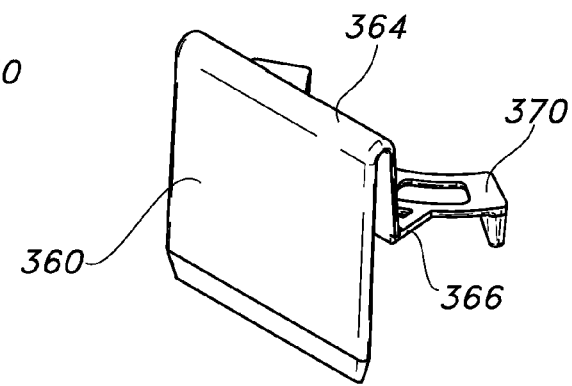
Figure 26:
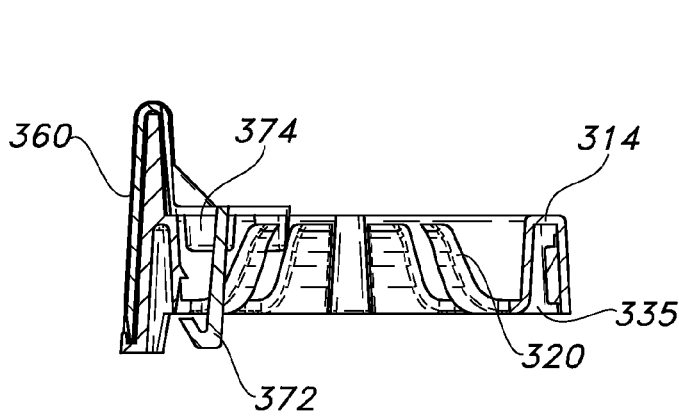

The present invention is directed to housings which support electronic tags that are attached to the extending neck of a bottle such as, for example, a beverage bottle. For such purposes, the bottle includes a perimetrical undercut extending around the neck which, as will be described in further detail hereinbelow, is engageable with the housing for securing the housing to the bottle neck. The undercut may be a ring, shoulder, label or other surface device or combination thereof which form a bump or recess. The housing accommodates various designs of electronic tags which may be used for a wide variety of purposes, such as tracking of items, inventory control, security and providing electronically readable information thereon. Typically, these tags may take two forms, such as a dual resonator (DR) tag or radio frequency (RF) tag.

As may be appreciated, the tag housing must securely retain the tag on the article, in this case, a beverage bottle, preventing unauthorized removal thereof by, for example, the consumer. Tags of this type are typically either non-removable, removable at the point of purchase, or made to be subsequently removed by the consumer once the item is purchased.

It has heretofore been difficult to provide a tag housing, which securely attaches to the extending neck of a bottle, preventing unauthorized removal, yet permitting the consumer to efficiently remove the tag housing once the item is purchased.

The present invention provides a tag housing which securely attaches to the extending neck of a bottle deterring unauthorized removal therefrom yet permits the consumer to remove the tag post purchase.

Referring to FIGS. 1-5, a first embodiment of the consumer removable tag housing of the present invention is shown.

Tag housing assembly 10 includes preferably a one piece integrally formed housing 12 including an annular wall 14 defining a bounded central opening 16. As the term is used herein, "annular wall" refers to a wall that includes an outer or exterior wall connected by a top wall to an inner or interior wall with an open annular space therebetween and an open side opposite the top wall. The annular wall can completely or partially surround the opening or passageway through the center of the tag housing.

Housing 12 further includes a retaining device 18 in the form of a plurality of inwardly directed, resiliently deflectable fingers 20 which extend in cantilevered fashion inwardly from annular wall 14. The fingers 20 of retaining device 18 extend into opening 16 and define a smaller passageway 22 for engagement with the extending neck 82 of the bottle 80 upon insertion thereover. The passageway 22, defined by fingers 20, is smaller in diameter than the neck of the bottle so that upon insertion of the tag housing assembly 10 over the neck of the bottle, the fingers 20 deflect outwardly to permit passage. The fingers 20 are deflectable outwardly to permit insertion of the tag housing assembly 10 over the bottle neck 82.

The fingers 20 each include distal ends 20a such that upon deflection, the distal ends 20a of the fingers engage the bottle neck. The distal ends 20a of fingers 20 are designed to be seatable beneath an undercut 84 on the neck 82 of the bottle 80.

The construction and arrangement of the fingers 20 permit the fingers 20 to resiliently engage the neck of the bottle such that the distal extents 20a non-releasably seat beneath the undercut 84 of the bottle 80. Once so positioned, the tag housing assembly 10 cannot be removed from the bottle neck 82 by sliding upwardly therealong. In this fashion, the tag housing assembly 10 cannot be non-destructibly removed from the bottle neck.

Tag housing assembly 10 of the present embodiment further includes a tag compartment 30 which opens to the bottom of the tag housing assembly 10. The tag compartment 30 includes an interior space 32 in which one or both of an RF tag 34 and/or a DR tag 36 is/are inserted. A cover 38 is designed to be positioned over the open end of the tag compartment 20 to enclose the one or more tags 34, 36 within the interior space 32. The cover 38 is designed to be ultrasonically or otherwise secured to the tag compartment 30 to prevent access to the tags contained therein.

A further feature of the present embodiment is that the tag housing assembly 10 may be applied to the extending neck of the bottle in one of two fashions. The tag housing assembly 10 may be inserted in the closed condition (FIG. 6) where the tag housing assembly 10 is inserted over the neck of the bottle and advanced therealong until it engages the undercut. In the alternative, the tag housing assembly 10 may be opened (FIG. 3) in a clamshell fashion to be placed around the bottle neck and then subsequently closed therearound.

As shown in the figures, annular wall 14 of housing 12 includes a thinned wall portion 40 which forms a living hinge 40 to permit opening of the housing 12. This hinge 40 defines a pair of arcuate housing members 42 and 44 which are pivotable about hinge 40. Distal ends 42a and 44a of arcuate housing member 42 and 44 include alignable openings 46 and 48. The arcuate members 42 and 44 may be opened about hinge 40 and then closed to place the openings 44 and 46 in vertical alignment. A pin 50 is insertable into the aligned openings 46 and 48 to retain housing 12 in a closed condition. The pin 50 is a one way pin which upon insertion into the openings is non-removable.

Thus, in addition to sliding the closed housing over the extending neck of the bottle, in certain situations, the housing 12 may be supplied in an open condition and placed about the bottle neck and closed and locked by insertion of pin 50.

A further feature of the present invention is also shown in the figures. In order to permit post purchase removal of the tag housing assembly from the neck of the bottle by the consumer, the hinge 40 also serves a second purpose. The hinge 40 is of reduced thickness so that when placed on the neck of the bottle a space 41 is created between the hinge and the neck of the bottle. This space 41 allows insertion of a cutting device such as scissors therebetween to allow the consumer to sever the annular wall 14 threat permitting removal of the tag housing assembly 10 from the bottle neck. The effort necessary to remove the tag housing assembly 10 from the bottle neck is enough to prevent unauthorized removal thereof prior to purchase, but is able to be overcome by the consumer once the product is purchased.

Referring now to FIGS. 11-15, a further embodiment of the tag housing assembly of the present invention is shown. Tag housing assembly 110 is substantially similar to tag housing 10 described hereinabove. Similar reference numerals denote similar components. The tag housing assembly 110 includes preferably a one piece integrally formed housing 112 having an annular wall 114 defining a bounded central opening 116. Housing 112 further includes a retaining device 118 in the form of a plurality of inwardly directed resiliently deflectable fingers 120 which extend in cantilevered fashion inwardly from annular wall 114. The fingers 120 of retaining device 118 extend into opening 116 and define a smaller passageway 122 for the engagement with the extending neck of the bottle upon insertion thereover.

The annular wall 114 of tag housing assembly 110 is uninterrupted. Unlike the embodiment described above, the annular wall cannot be opened. Thus, the only manner for attaching the tag assembly 110 to the bottle is to insert the housing 112 over the extending neck 182 of the bottle 180 so that the fingers 120 engage the undercut 184 of the bottle neck 182. In all other regards, the fingers 120 operate in a manner similar to that described above so that once positioned the tag housing assembly 110 cannot be removed from the bottle neck by sliding it upwardly therealong. Thus, the tag housing assembly 110 cannot be non-destructively removed from the bottle neck 182.

In the embodiment shown herein, the tag housing assembly 110 includes two separate locations for supporting the different electronic tags. The tag housing assembly 110 includes a flat enlarged wall 130 having a surface 132 which accommodates the RF tag 134. The RF tag 134 may be glued or otherwise secured to the surface 132. A cover 135 is positionable over the flat surface to enclose the RF tag in a compartment 139 and securely position it onto the tag housing 112.

Diametrically opposed from this location, annular wall 114 includes a cavity 135 which accommodates therein DR tag 136. The DR tag 136 may be secured to an interior wall by gluing or other securement techniques so as to securely position the DR tag 136 therein.

A still further feature of the present embodiment is that in order to permit post purchase removal of the tag housing assembly from the neck of the bottle by the consumer, two areas 140 of reduced thickness are provided so that when the tag housing is placed on the neck of the bottle a space 141 is created between the areas of reduced thickness and the neck of the bottle. These spaces 141 allow insertion of a cutting device, such as scissors, therebetween to allow the consumer to sever the annular wall 114 at either or both locations to permit removal of the tag housing assembly 110 from the bottle neck. Again, the effort necessary to remove the tag housing assembly 110 from the bottle neck is enough to prevent unauthorized removal thereof prior to purchase but is sufficient to be overcome by the consumer once the product is purchased.

Referring now FIGS. 16-20, a still further embodiment of the present invention is shown. Tag housing assembly 210 is substantially similar to tag housing assembly 110 described above. An open ended tag compartment 230 is provided for accommodating RF tag 234 which may be glued or otherwise secured therein. In all other respects, this embodiment is identical to the embodiment described immediately above. The tag housing assembly 210 is attached to bottle 280 by positioning it over extending neck 282 to engage undercut 284.

Referring now to FIGS. 21-26, a still further embodiment of the tag housing assembly of the present invention is shown. Tag housing assembly 310 is substantially similar to tag housing assembly 110 described above. Tag housing assembly 310 includes preferably an integrally formed housing 312 having an annular wall 314 defining a bounded central opening 316. Housing 312 further includes retaining device 318 in the form of a plurality inwardly directed resiliently deflectable fingers 320 which extend inwardly in cantilevered fashion from annular wall 314. The fingers 320 of retaining device 318 extend into opening 316 and define a smaller passageway 322 for engagement with extending neck of the bottle upon insertion thereover.

As with the above embodiment, the annular wall 314 of the housing 312 is uninterrupted. The tag housing 312 includes two areas 340 of reduced thickness so that when the tag housing 312 is placed on the neck of the bottle a space 341 is created between each of the areas of reduced thickness in the neck of the bottle. These spaces 341 allow insertion of a cutting device, such as scissors, therebetween to allow the consumer to sever the annular wall 314 at either or both locations to permit removal of the tag housing assembly 310 from the bottle neck.

The housing 312 also includes two separate locations for supporting different electronic tags. As with the embodiment described above, annular wall 314 includes a cavity 335 which accommodates a DR tag 336. The DR tag 336 may be secured to one interior wall by gluing or other securement technique so as to securely position the DR tag 336 therein. Diametrically opposed from this location, the tag housing 312 includes a flat enlarged wall 330 having a surface 332 which accommodates the RF tag 334 in compartment 339. The RF tag 334 may be glued or otherwise secured to the surface 332.

The present invention further includes a combined cover and locking device 350, which is both used to cover the surface 332 of wall 330 to enclose the RF tag 334 and is also useful in locking the resiliently deflectable fingers 320 around the neck of the bottle as will be described in further detail hereinbelow.

Referring more specifically to FIGS. 24-27, the locking device 350 includes a an elongate flat wall 360 which covers surface 332 of enlarged wall 330 and a U-shaped joining member 364 from which extends a short wall 366, which is generally parallel to wall 360. Extending from the end of short wall 366 is a locking element 370. Locking element 370, in top view, is generally arcuate having a depending resilient latch 372 and a plurality of depending ribs 374.

Figure 27:
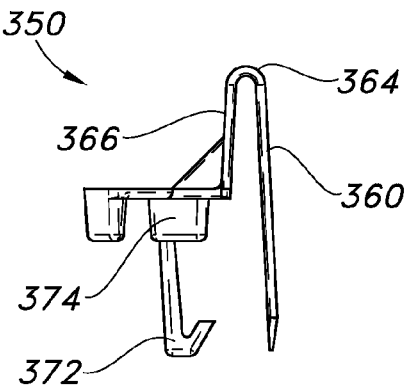
FIG. 27 is a sectional showing of the tag housing assembly of FIG. 21 including the locking device of FIG. 25.

As shown in FIG. 27 when the locking device 350 is attached to the housing 312, the wall 360 forms a cover for surface 332. The latch 372 engages the undersurface of annular wall 314 to lock it in place. In this position, each of the ribs 374 reside behind one of the locking fingers 320. This prevents the locking fingers 320 adjacent the ribs 374 from being deflected in a rearward direction to facilitate unauthorized removal of the tag housing assembly 310 from the bottle neck.

It is contemplated that the tag housing assembly 310 shown in FIGS. 21-26 is used in the following manner. With each of the tags 334, 336 installed in the housing 312 and the locking device 350 removed therefrom, the tag housing 312 is inserted over the neck of the bottle. Once properly positioned with the fingers 320 in engagement with the undercut of the neck, the cover and locking device 350 is attached thereto. The cover and locking device 350 covers the surface 332 of enlarged wall 330, and also locks onto the annular wall 314. In this position, the ribs 374 are positioned behind adjacent deflectable fingers 320 and prevent the deflectable fingers from being pushed backwardly to remove the tag housing assembly in an unauthorized manner. As with the above embodiments, tag housing assembly 312 may be removed by insertion of a cutting device in spaces 341 to sever the annular wall 314 at areas 340 of reduced thickness.

Referring now to FIGS. 8, 9 and 10, an accessory device 400 is shown. Accessory device 400 is generally a frusto-conically shaped member which is hollow and which may be applied over the neck of the bottle. This device has two functions. First, it helps move the tag housing assembly along the neck of the bottle without damaging the bottle neck. This is particularly beneficial where the bottle neck has a label, foil or other decorative ornamentation placed thereon where movement of the tag housing assembly over the bottle neck would cause damage to the decorative ornamentation. In addition, the accessory properly locates and seats the tag housing assembly with respect to the undercut on the bottle.

Figure 28:
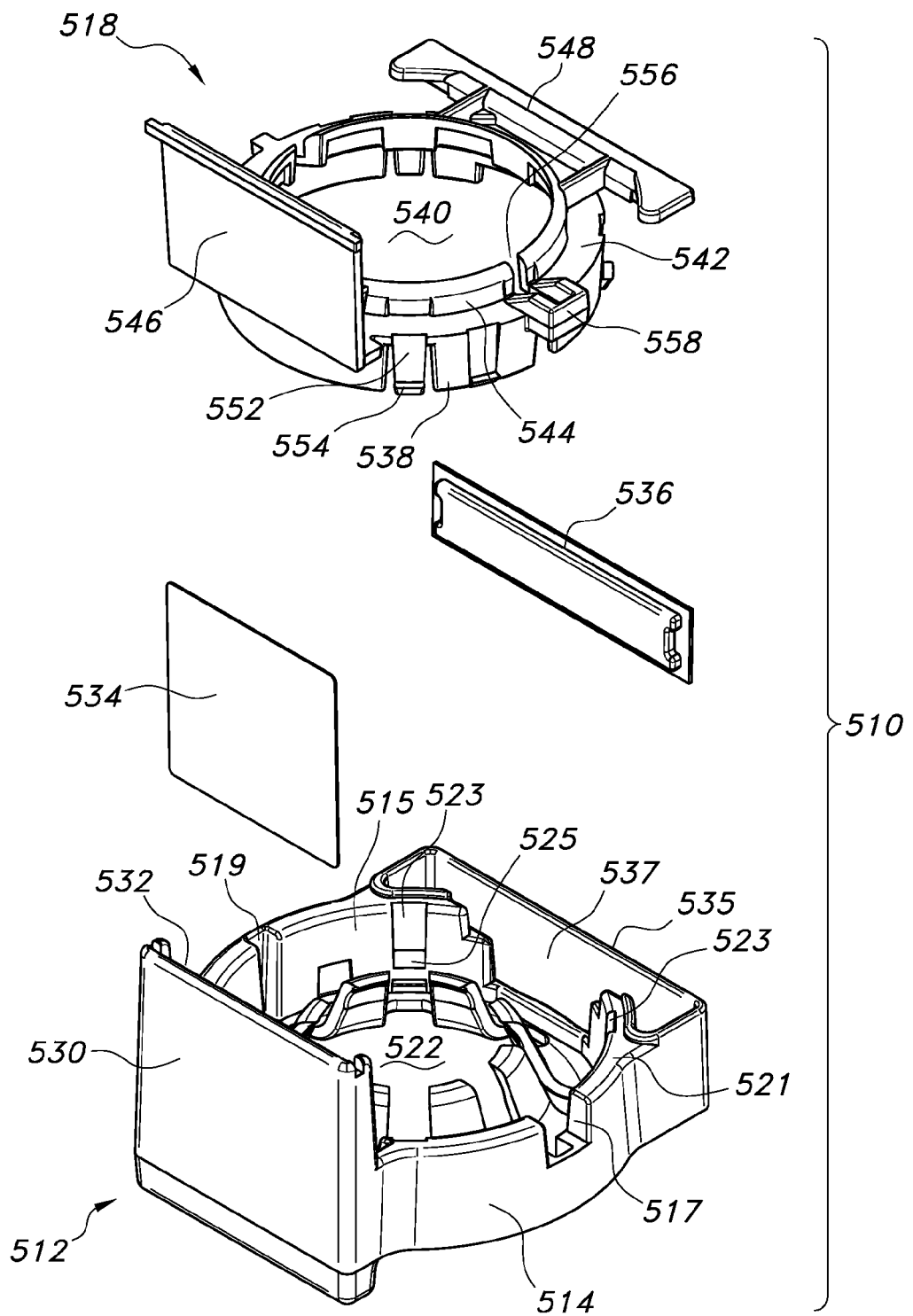
FIG. 28 is an exploded view of another embodiment of the tag housing assembly.
Figure 29:
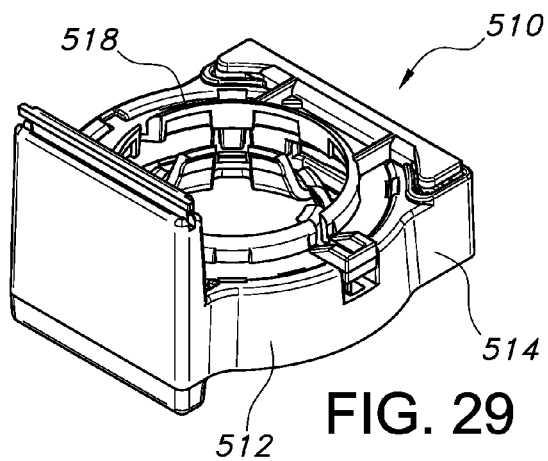
FIG. 29 is a top perspective view of the tag housing assembly shown in FIG. 28 with the insert partially inserted in the housing.
Figure 30:
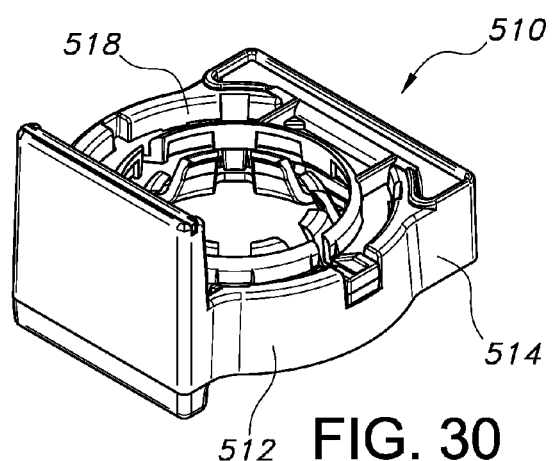
FIG. 30 is a top perspective view of the tag housing assembly shown in FIG. 28 with the insert fully inserted in the housing.
Figure 31:
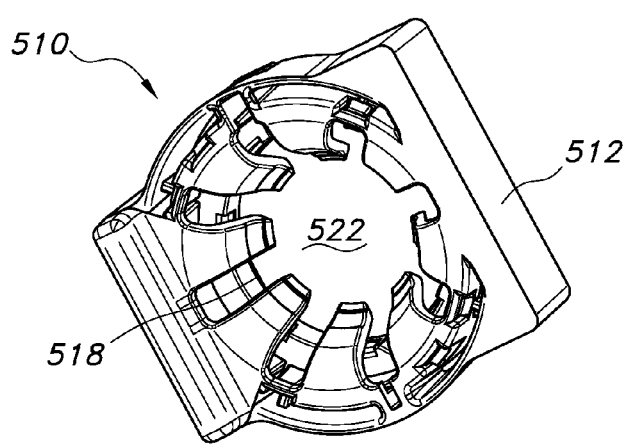
FIG. 31 is a bottom perspective view of the tag housing assembly shown in FIG. 28.
Figure 37:
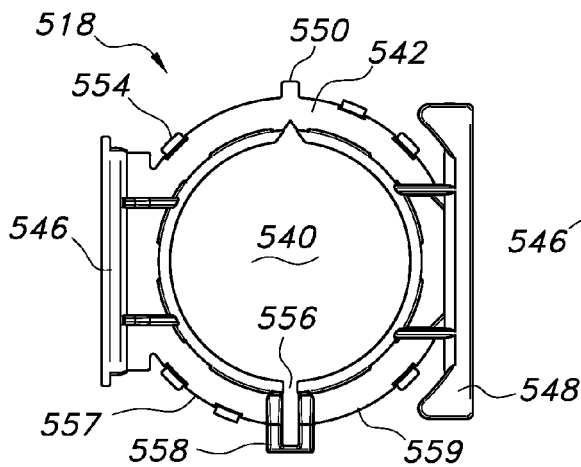
FIG. 37 is a top view of the insert of the tag housing assembly shown in FIG. 28.
Figure 40:
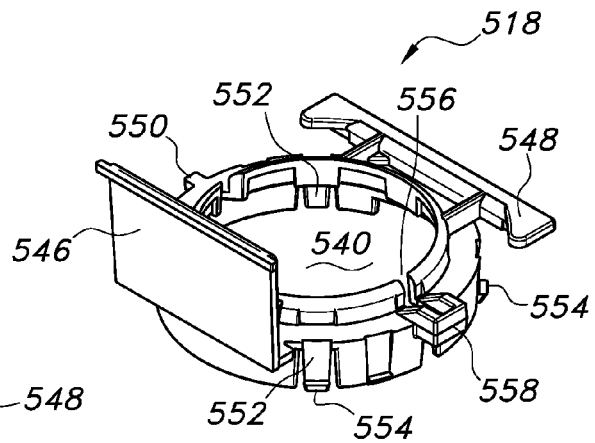
FIG. 40 is a top perspective view of the insert of the tag housing assembly shown in FIG. 28.
Figure 38:
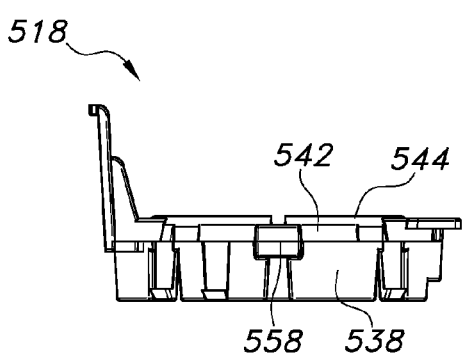
FIG. 38 is a side view of the insert of the tag housing assembly shown in FIG. 28.
Figure 41:
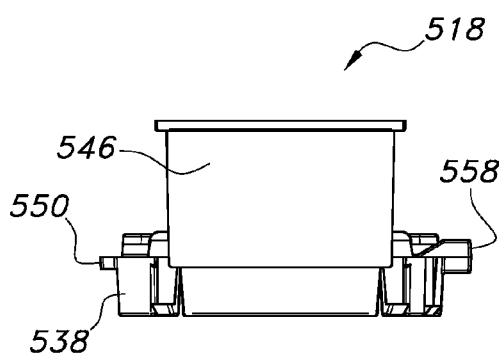
FIG. 41 is an end view of the insert of the tag housing assembly shown in FIG. 28.
Figure 39:
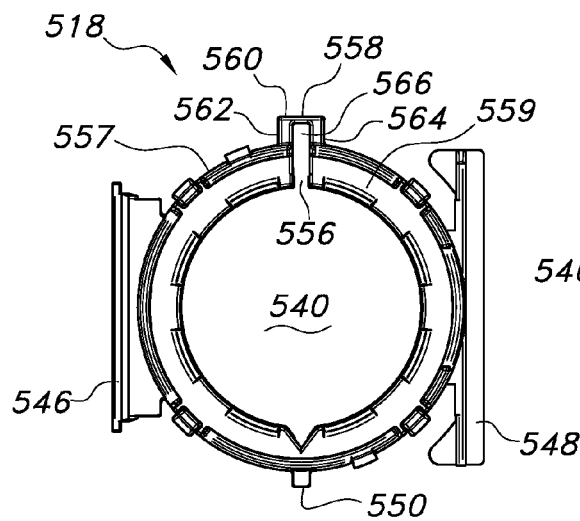
FIG. 39 is a bottom view of the insert of the tag housing assembly shown in FIG. 28.
Figure 42:
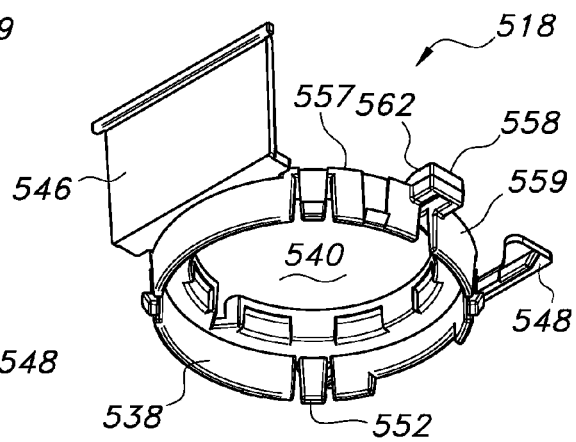
FIG. 42 is a bottom perspective view of the insert of the tag housing assembly shown in FIG. 28.

Another embodiment of the housing assembly 510 is shown in FIGS. 28-42. Tag housing assembly 510 is substantially similar to tag housing assemblies 10, 110, 210 and 310 described hereinabove. Similar reference numerals denote similar components. FIG. 28 shows an exploded view of the housing assembly 510 that includes a housing 512 with an annular wall 514, a locking device 518, an RF tag 534 and a DR tag 536. After the RF tag 534 and the DR tag 536 are positioned in the housing 512, the locking device 518 is placed onto the housing 512 in an open position (See FIG. 29), wherein the top wall 521 of the housing 512 is approximately level with the ledge 542 of the locking device 518. Subsequently, the housing assembly 510 can be installed on the neck of a bottle (similar to FIG. 2) and the locking device 518 pushed into the housing 512 to create a closed or locked position (see FIG. 30), wherein the ledge 542 of the locking device 518 is below the level of the top wall 521 of the housing 512.

The housing 512 (see FIGS. 28 and 32-36) has a tag compartment 530 with an interior space 532 that an receive the RF tag 534 on one end and a tag enclosure 535 with an interior space 537 on the opposing end that can receive the DR tag 536. The annular wall 514 includes a perimetrical wall 513 that extends around the outside of the housing 512 and an interior wall 515 that surrounds a central opening 516 in the housing 512. The perimetrical wall 513 and the interior wall 515 are connected by a top wall 521 that extends between the tag compartment 530 and the tag enclosure 535 on both sides of the housing 512. On one side of the housing 512, a notch 517 extends downwardly from the top wall surface 521 between the interior wall 515 and the perimetrical wall 513 and on the opposing side a slot 519 in the interior wall 515 extends downwardly from the top wall 521. The interior wall 515 also has a plurality of locking slots 523 extending from the top wall 521 to a recess 525. At the base of the interior wall 515, a plurality of fingers 520 extend inwardly and upwardly from the interior wall 515 into the central opening 516 to distal ends 520a. The distal ends 520a of the flexible fingers 520 form a passageway 522 that has a diameter less than the diameter of the central opening 516.

The locking device 518 (see FIGS. 28 and 37-42) is formed by a substantially circular lower side wall 538 that defines an aperture 540 and a ledge 542 along the top of the lower side wall 538 that extends into the aperture 540. A substantially circular upper side wall 544 extends upwardly from the interior side of the ledge 542. The upper side wall 544 is substantially concentric with, and has a diameter less than, the lower side wall 538. On one end of the ledge 542, a cover 546 extends outwardly and upwardly and on the opposite end of the locking device 518, a lid 548 extends outwardly and downwardly from the ledge 542 (i.e., the cover 546 and lid 548 are spaced about 180 degrees apart). The sizes and locations of the cover 546 and lid 548 correspond to the sizes and locations of the tag compartment 530 and tag enclosure 535 in the housing 512, respectively. When the housing 512 and locking device 518 are joined together, the cover 546 encloses the tag compartment 530 and the lid 548 encloses the tag enclosure 535.

On one side of the locking device 518, there is a prong 550 that extends outwardly from the ledge 542. The prong 550 can also extend downwardly along the lower side wall 538. The lower side wall 538 can include one or more flexible legs 552 that extend downwardly from the ledge 542. The flexible legs 552 have a stub 554 that extends outwardly from the distal end of the flexible legs 552. When the locking device 518 is positioned on the housing 512, the prong 550 is inserted into the slot 519 in the interior wall 515 of the housing 512 and the flexible legs 552 are inserted in the locking slots 523. When the locking device 518 is secured to the housing 512 (i.e., the housing assembly 510 is in the closed or locked position), the stubs 554 on the flexible legs 552 snap into the recessed portions 525 of the locking slots 523 and cannot be withdrawn.

On the side of the locking device 518 opposite the prong 550, there is a slit 556 that divides the lower side wall 538, upper side wall 544 and ledge 542 into first and second wall sections 557, 559 that are connected by a tab 558. The tab 558 is U-shaped with a base 560 and first and second legs 562, 564 extending from the base 560 to form the slot 566 therebetween. The first and second legs 562, 564 are connected to the first and second wall sections 557, 559. The base 560 of the tab 558 is substantially parallel to the upper side wall 544 and has a thickness. The lower side wall 538 and the upper side wall 554 also have thicknesses that are measured in the same direction as the thickness of the base 560. The thickness of the base 560 is less than 50%, preferably less than 35% and most preferably less than 20% of the thicknesses of both the lower and upper side walls 538, 544.

When the locking device 518 is positioned on the housing 512 (similar to FIG. 2), the tab 558 is inserted into the notch 517 in the annular wall 514 of the housing 512. The housing assembly 510 is then placed on a bottle by inserting the neck of the bottle through the passageway 522 formed by the flexible fingers 520. The housing assembly 510 is locked onto the neck of the bottle by pushing down on the locking device 518 so that the flexible legs 520 on the lower side wall 538 engage the locking slots 523 on the interior wall 515 of the housing 512, the cover 546 and lid 548 of the locking device 518 are secured to the tag compartment 530 and tag enclosure 535, respectively, and the upper side wall 544 of the locking device 518 pushes the plurality of flexible fingers 520 inwardly against the neck of the bottle (similar to FIG. 2) to engage the undercut with the distal ends 520a of the plurality of fingers 520. Once the locking device 518 is secured in the housing 512, it cannot be removed without damaging the housing assembly 510. After a consumer purchases the bottle to which the housing assembly 510 is attached, the consumer can easily remove the housing assembly 510 by inserting a knife, scissors, screw driver or other thin rigid object through the slot 566 in the tab 558 and twisting to break the base 560 of the tab 558. The two wall sections 557, 559 can then be pushed together to release the flexible legs 552 from the locking slots 523 in the housing 512. This also releases the plurality of flexible fingers 520 from around the neck of the bottle and permits the tag housing assemble 510 to be removed from the bottle.

Various changes to the foregoing described and shown structures would now be evident to those skilled in the art. Accordingly, the particularly disclosed scope of the invention is set forth in the following claims.

What is claimed:

1. An electronic tag housing assembly for attachment to an extending neck of a bottle having an undercut thereabout comprising:
    a housing having an annular wall and a central opening for insertion over said extending bottle neck, and
    at least one electronic tag supported by said housing;
    said housing having a plurality of resilient fingers extending into said aperture for engagement with undercut on said bottle neck for securing said housing therethrough;
    said housing further including a portion of said annular wall having a location of thickness that is reduced by at least 50% for effecting severing of said annular wall thereat so as to remove said housing from said bottle neck and wherein said location of reduced thickness provides a space between said annular wall and said bottle neck for insertion of a cutting tool therebetween.

2. The electronic tag housing assembly according to claim 1, wherein said location of reduced thickness defines a hinge and wherein said annular wall is openable about said hinge.

3. The electronic tag housing assembly according to claim 2, wherein said annular wall includes a locking element for locking said annular wall in a closed position.

4. The electronic tag housing assembly according to claim 3, wherein said annular wall defines a pair of arcuate members joined at said hinge and distal elements which are mutually engageable on said closed position.

5. The electronic tag housing assembly according to claim 4, wherein said distal end includes openings therethrough which are alignable in said closed position and wherein said locking element includes a pin insertable into said aligned openings.

6. The electronic tag housing assembly according to claim 1, wherein said annular wall includes a pair of said locations of reduced thickness.

7. The electronic tag housing assembly according to claim 6, wherein said pair of locations of reduced thickness are diametrically opposed on said annular wall.

8. The electronic tag housing according to claim 1, wherein said at least one tag is a dual resonator tag.

9. The electronic tag housing according to claim 1, wherein said at least one tag is a radio frequency tag.

10. The electronic tag housing according to claim 1, wherein said housing includes a tag compartment supporting both a dual resonator tag and a radio frequency tag.

11. The electronic tag housing according to claim 1, wherein said housing include a tag compartment for supporting a dual resonator tag and a cavity for supporting a radio frequency tag.

12. The electronic tag housing according to claim 11, wherein said tag housing compartment is defined by a base and a cover.

13. An electronic tag housing for attachment to an extending neck of a bottle having an undercut thereabout comprising:
- a housing having an annular wall and a central opening for insertion over said extending neck of said bottle, wherein the annular wall has a location of reduced thickness that defines a hinge, and wherein said annular wall is openable about said hinge;
- at least one electronic tag supported by said housing;
- a plurality of resilient gripping fingers extending from said annular wall into said central opening for engagement with said undercut on said bottle neck;
- a locking device attachable to said annular wall having engagement elements positioned between said at least one finger and said annular wall for preventing resilient detachment of said at least one finger.

14. An electronic tag housing assembly for attachment to an extending neck of a bottle having an undercut thereabout comprising:
- a housing comprising an annular wall comprising an inner wall connected by a top wall to an outer wall, a notch and a central opening for receiving therethrough said extending bottle neck, wherein said inner wall has one or more slots extending downwardly from said top wall to a recess, and wherein said housing having a plurality of resilient fingers extending from said inner wall into said central opening for engagement with said undercut on said bottle neck for securing said housing thereto;
- at least one electronic tag supported by said housing;
- a locking device comprising a substantially circular lower side wall having a first diameter and a first thickness connected to a substantially circular upper side wall having a second diameter and a second thickness by a ledge, wherein said first diameter is greater than said second diameter, wherein said upper side wall and said lower side wall define an aperture, wherein a slit extending through said upper side wall, said lower side wall and said ledge forms a first wall section and a second wall section, and wherein said lower side wall comprises one or more flexible legs extending downwardly from said ledge to a distal end with a stub extending outwardly; and
- a U-shaped tab comprising a base with first and second legs extending therefrom with a slot in between said legs, wherein said first and second legs are connected to said first and second wall sections, respectively, and wherein said base has a third thickness that is less than said first and second thicknesses;
- wherein said locking device is positioned on said housing so that said plurality of flexible fingers extend through said aperture and said tab is positioned in said notch, wherein, after a bottle neck is inserted into said central opening, said locking device is pushed down into said housing so that said stubs on said flexible legs engage said recesses in said locking slots to secure said locking device to said housing, wherein said upper side wall pushes said plurality of resilient flexible fingers inwardly to engage said neck of said bottle below said undercut, and wherein said housing assembly can be removed from said bottle neck by severing said base of said tab.

15. The electronic tag housing assembly according to claim 14, wherein said housing further comprising a compartment with an open side extending upwardly from one side of said annular wall and an enclosure with an open top extending outwardly from an opposing side of said annular wall.

16. The electronic tag housing assembly according to claim 15, wherein said locking device further comprising a cover extending outwardly and upwardly from said ledge and a lid extending outwardly from said ledge on an opposing side of said locking device, wherein said cover and said lid are correspondingly located with said compartment and said enclosure, respectively, and wherein, when said locking device is secured to said housing, said cover is secured to said open side of said compartment and said lid is secured to said open top of said enclosure.

17. The electronic tag housing assembly according to claim 14, wherein said housing further comprises a slot in said inner wall positioned opposite said notch and extending downwardly from said top wall, wherein said locking device further comprises a prong that extends outwardly from said ledge opposite said slit, and wherein, when said locking device is secured to said housing, said prong is engaged in said slot.

18. The electronic tag housing assembly according to claim 14, wherein said at least one electronic tag is a dual resonator tag, a radio frequency tag or a dual resonator tag and a radio frequency tag.

* * * * *